United States Patent
Kim et al.

(10) Patent No.: US 11,629,395 B2
(45) Date of Patent: Apr. 18, 2023

(54) HOT STAMPING COMPONENT AND METHOD OF MANUFACTURING THE SAME

(71) Applicant: Hyundai Steel Company, Incheon (KR)

(72) Inventors: Hye Jin Kim, Incheon (KR); Kyu Yeon Hwang, Incheon (KR); Hyun Yeong Jung, Incheon (KR); Jin Ho Lee, Gyeonggi-do (KR); Seung Pill Jung, Incheon (KR)

(73) Assignee: Hyundai Steel Company, Incheon (KR)

( * ) Notice: Subject to any disclaimer, the term of this patent is extended or adjusted under 35 U.S.C. 154(b) by 48 days.

(21) Appl. No.: 17/110,092

(22) Filed: Dec. 2, 2020

(65) Prior Publication Data

US 2021/0187583 A1  Jun. 24, 2021

(30) Foreign Application Priority Data

Dec. 20, 2019 (KR) .................. 10-2019-0171790
Sep. 28, 2020 (KR) .................. 10-2020-0126391

(51) Int. Cl.
| | |
|---|---|
| C23C 2/02 | (2006.01) |
| B21D 22/02 | (2006.01) |
| B21D 37/16 | (2006.01) |
| B32B 15/01 | (2006.01) |
| C21D 1/673 | (2006.01) |
| C22C 38/00 | (2006.01) |
| C23C 2/26 | (2006.01) |

(Continued)

(52) U.S. Cl.
CPC .............. *C23C 2/02* (2013.01); *B21D 22/022* (2013.01); *B21D 37/16* (2013.01); *B32B 15/012* (2013.01); *C21D 1/673* (2013.01); *C22C 38/00* (2013.01); *C23C 2/12* (2013.01); *C23C 2/26* (2013.01); *C23C 2/28* (2013.01); *C23C 2/40* (2013.01); *F27B 9/028* (2013.01)

(58) Field of Classification Search
None
See application file for complete search history.

(56) References Cited

U.S. PATENT DOCUMENTS

| | | | |
|---|---|---|---|
| 8,986,849 B2 | 3/2015 | Maki et al. | |
| 9,228,148 B2* | 1/2016 | Hüffer | ................. C10M 105/74 |

(Continued)

FOREIGN PATENT DOCUMENTS

| | | |
|---|---|---|
| CN | 108588612 B | 9/2019 |
| JP | 2018030988 A | 3/2018 |

(Continued)

OTHER PUBLICATIONS

First Examination Report dated Jul. 26, 2022 in Indian Patent Application No. 202117054581.

*Primary Examiner* — Daniel J. Schleis
(74) *Attorney, Agent, or Firm* — Fox Rothschild LLP

(57) ABSTRACT

Disclosed is a hot-stamping component, which includes a base steel plate; and a plated layer on the base steel plate and including a first layer, a second layer, and an intermetallic compound portion having an island shape in the second layer, wherein the first layer and the second layer are sequentially stacked, and an area fraction of the intermetallic compound portion with respect to the second layer is an amount of 20% to 60%.

5 Claims, 11 Drawing Sheets

(51) Int. Cl.
*C23C 2/12* (2006.01)
*C23C 2/40* (2006.01)
*C23C 2/28* (2006.01)
*F27B 9/02* (2006.01)

(56) References Cited

U.S. PATENT DOCUMENTS

| | | |
|---|---|---|
| 10,286,439 B2 | 5/2019 | Jin et al. |
| 11,248,276 B2 | 2/2022 | Yi et al. |
| 2015/0361532 A1 | 12/2015 | Nam et al. |
| 2018/0002797 A1 | 1/2018 | Oh et al. |
| 2020/0086608 A1 | 3/2020 | Oh et al. |

FOREIGN PATENT DOCUMENTS

| | | | |
|---|---|---|---|
| KR | 1020110038763 A | | 4/2011 |
| KR | 1020110091888 A | | 8/2011 |
| KR | 101318060 B1 | | 10/2013 |
| KR | 20150075435 | * | 7/2015 |
| KR | 1020150075435 A | | 7/2015 |
| KR | 1020160079944 A | | 7/2016 |
| KR | 1020180074449 A | | 7/2018 |
| KR | 10-2018-0095757 A | | 8/2018 |
| KR | 1020190078013 A | | 7/2019 |
| WO | 2010063618 A1 | | 6/2010 |
| WO | 2012/137687 A1 | | 10/2012 |

\* cited by examiner

FIG. 2

|   | AVERAGE GRAIN SIZE OF SECOND LAYER (μm) | ADHESIVE STRENGTH (MPa) |
|---|---|---|
| a | 3 | 6.52 |
| b | 7 | 6.09 |
| c | 10 | 5.37 |
| d | 15 | 5.21 |
| e | 17 | 3.94 |
| f | 20 | 3.85 |

HOT STAMPING COMPONENT AND METHOD OF MANUFACTURING THE SAME

CROSS-REFERENCE TO RELATED APPLICATIONS

This application is based on and claims priority under 35 U.S.C. § 119 to Korean Patent Application No. 10-2019-0171790, filed on Dec. 20, 2019, and No. 10-2020-0126391, filed on Sep. 28, 2020, in the Korean Intellectual Property Office, the disclosures of which are incorporated by reference herein in their entirety.

BACKGROUND

1. Field

The present invention relates to a hot-stamping component and a method of manufacturing the same.

2. Description of the Related Art

As environmental regulations and fuel economy-related regulations are strengthened all over the world, the need for lighter materials for vehicles is increasing. Accordingly, researches on and development of ultra-high-strength steel and hot-stamping steel have been actively conducted. A hot stamping process generally includes heating/molding/cooling/trimming operations, and uses a phase transformation of materials and a change in microstructures during the process.

Recently, studies have been actively conducted to prevent the occurrence of delayed fracture that occurs in a hot-stamping component manufactured by a hot stamping process as well as to improve the corrosion resistance and weldability of the same. Related technologies include a Korean Patent Publication No. 10-2018-0095757 directed to a method of manufacturing a hot-stamping component.

SUMMARY

Exemplary embodiments of the present disclosure provide a hot-stamping component with improved hydrogen embrittlement, corrosion resistance, and weldability, and a method of manufacturing the hot-stamping component.

According to an exemplary embodiment of the present disclosure, provided is a hot-stamping component, which includes a base steel plate; and a plated layer on the base steel plate and including a first layer, a second layer, and an intermetallic compound portion having an island shape in the second layer, wherein the first layer and the second layer are sequentially stacked, and an area fraction of the intermetallic compound portion with respect to the second layer is 20% to 60%.

According to the exemplary embodiment, the second layer may include at least one of an $FeAl_3$ phase and an $Fe_2Al_5$ phase, and an average grain size of the $FeAl_3$ phase and the $Fe_2Al_5$ phase is 3 µm to 15 µm.

According to the exemplary embodiment, the intermetallic compound portion may be discontinuously arranged in the second layer.

According to the exemplary embodiment, the intermetallic compound portion may include an amount of 62 wt % to 67 wt % of iron (Fe), an amount of 2 wt % to 6 wt % of silicon (Si), and an amount of 30 wt % to 34 wt % of aluminum (Al).

According to the exemplary embodiment, a content of aluminum in the intermetallic compound portion may be greater than a content of aluminum in the second layer.

According to the exemplary embodiment, the plated layer may further include a surface layer stacked on the second layer, and an average thickness of the surface layer may be about 100 nm to about 200 nm.

According to the exemplary embodiment, the base steel plate may include an amount of 0.19 wt % to 0.38 wt % of carbon (C), an amount of 0.1 wt % to 1 wt % of silicon (Si), an amount of 1 wt % to 2 wt % of manganese (Mn), an amount of greater than 0 wt % and less than or equal to 0.03 wt % of phosphorus (P), an amount of greater than 0 wt % and less than or equal to 0.01 wt % of sulfur (S), an amount of 0.1 wt % to 0.6 wt % of chromium (Cr), an amount of 0.01 wt % to 0.05 wt % of titanium (Ti), an amount of 0.001 wt % to 0.005 wt % of boron (B), remaining iron (Fe), and unavoidable impurities.

According to another exemplary embodiment of the present disclosure, provided is a method of manufacturing a hot-stamping component, which includes manufacturing a plated steel plate by immersing a base steel plate in a plating bath including aluminum and silicon; coating the plated steel plate with an oil including an ester-based compound; forming a blank by cutting the plated steel plate coated with the oil; and heating the blank in a heating furnace.

According to the exemplary embodiment, the oil may be coated at 0.1 $g/m^2$ to 10 $g/m^2$ on the plated steel plate.

According to the exemplary embodiment, the oil may include an amount of 10 wt % to 30 wt % of hydrotreated heavy paraffin refined oil, an amount of 30 wt % to 50 wt % of solvent-dewaxed heavy paraffin refined oil, an amount of 1 wt % to 5 wt % of solvent-refined heavy paraffin refined oil, and an amount of 10 wt % to 40 wt % of an ester-based compound.

According to the exemplary embodiment, in the heating of the blank in the heating furnace, the heating furnace may have a plurality of sections having different temperature ranges from each other, and the blank may be heated in stages in the heating furnace.

According to the exemplary embodiment, in the heating of the blank in the heating furnace, a heating rate of the blank may be 4.5° C./s to 10° C./s.

According to the exemplary embodiment, in the heating of the blank in the heating furnace, at least two blanks having different thicknesses from each other may be simultaneously transferred into the heating furnace.

According to the exemplary embodiment, the method may further include, after the heating of the blank, transferring the heated blank from the heating furnace to a press mold; forming a molded body by hot-stamping the transferred blank; and cooling the formed molded body.

BRIEF DESCRIPTION OF THE DRAWINGS

FIG. 2 is a table showing an evaluation result of the peeling resistance of a second layer included in a hot-stamping component according to an exemplary embodiment;

DETAILED DESCRIPTION

Figure 1:
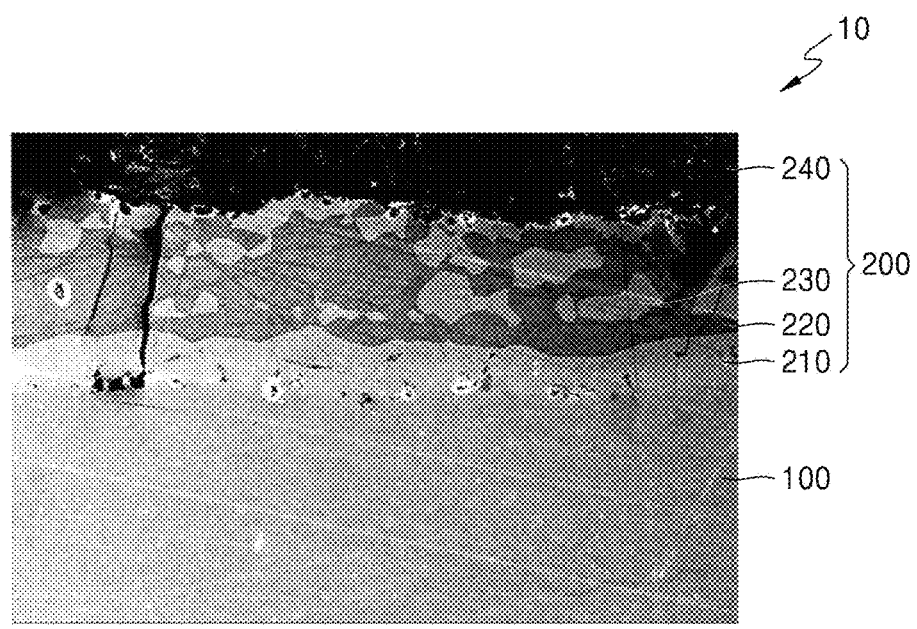
FIG. 1 is a cross-sectional view of a hot-stamping component according to an exemplary embodiment.

As the present disclosure allows for various changes and numerous embodiments, particular embodiments will be illustrated in the drawings and described in detail in the written description. Effects, features, and methods of achieving the same of the present disclosure are described in detail below with drawings. This present disclosure may, however, be embodied in many different forms and should not be construed as being limited to the exemplary embodiments set forth herein.

In the following exemplary embodiments, such terms as "first," "second," etc., may be used to describe various components and to distinguish one component from the other component, such components must not be limited to the above terms.

An expression used in the singular encompasses the expression of the plural, unless it has a clearly different meaning in the context.

In the following embodiments, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a layer, region, or component is referred to as being "formed on" another layer, region, or component, it can be directly or indirectly formed on the other layer, region, or component.

Sizes of components in the drawings may be exaggerated or reduced for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Hereinafter, the present disclosure will be described more fully with reference to the accompanying drawings, in which exemplary embodiments of the inventive concept are shown. Likewise reference numerals may denote like elements in different drawings.

FIG. 1 is a cross-sectional view of a hot-stamping component 10 according to an embodiment of the present disclosure.

Referring to FIG. 1, the hot-stamping component 10 according to an exemplary embodiment of the present disclosure may include a base steel plate 100 and a plated layer 200 on the base steel plate 100.

The base steel plate 100 may be a steel plate manufactured by performing a hot-rolling operation and a cold-rolling operation on cast steel slabs to include a certain alloying element in a certain content. For example, the base steel plate 100 may include carbon (C), silicon (Si), manganese (Mn), phosphorus (P), sulfur (S), titanium (Ti), boron (B), remaining iron (Fe), and other unavoidable impurities. In addition, the base steel plate 100 may further include one or more components of niobium (Nb), molybdenum (Mo), and aluminum (Al).

C is a major element that determines strength and hardness of the base steel plate 100, and is added to secure tensile strength and hardenability characteristics of the base steel plate 100 after a hot stamping operation. For example, an amount of 0.19 wt % to 0.38 wt % of C may be included based on a total weight of the base steel plate 100. When a content of C is less than 0.19 wt %, the mechanical strength of the base steel plate 100 may be difficult to be secured. On the other hand, when the content of C exceeds 0.38 wt %, the toughness of the base steel plate 100 may be reduced or a problem of brittleness control may be caused.

Si is a solid solution strengthening element, which may improve strength and ductility of the base steel plate 100. In addition, Si may suppress the formation of cementite, which is a starting point of crack due to hydrogen embrittlement. Based on the total weight of the base steel plate 100, an amount of 0.1 wt % to 1 wt % of Si may be included. When a content of Si is less than 0.1 wt %, the above-described effect may be difficult to obtain. On the other hand, when the content of Si exceeds 1 wt %, the plating characteristics of the base steel plate 100 may be reduced.

Mn is added to increase hardenability and strength of the base steel plate 100 during heat treatment. Based on the total weight of the base steel plate 100, an amount of 1 wt % to 2 wt % of Mn may be included. When a content of Mn is less than 1 wt %, a grain refining effect may not be sufficient, and the hard phase fraction of a hot-stamping component may be insufficient. On the other hand, when the content of Mn exceeds 2 wt %, the ductility and toughness of the base steel plate 100 due to manganese segregation or perlite bands may be reduced, which may cause a decrease in bending performance of the base steel plate 100 and a heterogeneous microstructure may occur.

P is added to prevent toughness of the base steel plate 100 from reducing. Based on the total weight of the base steel plate 100, an amount of greater than 0 wt % and less than or equal to 0.03 wt % of P may be included. When a content of P exceeds 0.03 wt %, an iron phosphide compound is formed to reduce toughness of the base steel plate 100, and cracks may be caused in the base steel plate 100 during a manufacturing operation.

Based on the total weight of the base steel plate 100, an amount of greater than 0 wt % and less than or equal to 0.03 wt % of S may be included. When a content of S exceeds 0.01 wt %, hot-workability of the base steel plate 100 may be reduced, and surface defects such as cracks may occur due to the formation of large inclusions.

Chromium (Cr) is added to improve hardenability and strength of the base steel plate 100. Based on the total weight of the base steel plate 100, an amount of 0.1 wt % to 0.6 wt % of Cr may be included. When a content of Cr is less than 0.1 wt %, an effect of improving the hardenability and strength of the base steel plate 100 may not be sufficient. On the other hand, when the content of Cr exceeds 0.6 wt %, production cost may increase and the toughness of the base steel plate 100 may decrease.

Titanium (Ti) is added to enhance hardenability of the base steel plate 100 by forming precipitates after a hot-stamping heating treatment, and improve materials of the base steel plate 100. In addition, Ti forms a precipitated phase such as Ti(C, N) or the like at a high temperature, thereby effectively contributing to refinement of austenite grains. Based on the total weight of the base steel plate 100, an amount of 0.01 wt % to 0.05 wt % of Ti may be included. When a content of Ti is less than 0.01 wt %, the formation of precipitates is insignificant and the grain refining effect may not be sufficient. On the other hand, when the content of Ti exceeds 0.05 wt %, an elongation percentage of the base steel plate 100 may be decreased and a decrease in toughness of the same may occur.

Boron (B) is added to secure hardenability and strength of the base steel plate 100 by obtaining a martensitic structure. B also has a grain refining effect by increasing an austenite grain growth temperature. Based on the total weight of the base steel plate 100, an amount of 0.001 wt % to 0.005 wt % of B may be included. When a content of B is less than 0.001 wt %, an effect of improving the hardenability of the base steel plate 100 may not be sufficient. On the other hand, when the content of B exceeds 0.005 wt %, the risk of brittleness and the risk of low elongation percentage of the base steel plate 100 may increase.

For example, when the tensile strength of a manufactured hot-stamping component is aimed at 1680 MPa or more, the base steel plate 100 may include an amount of 0.20 wt % to about 0.50 wt % of C, an amount of 0.15 wt % to 0.70 wt % of Si, an amount of 0.5 wt % to 2.0 wt % of Mn, an amount of greater than 0 wt % and less than or equal to 0.05 wt % of P, an amount of greater than 0 wt % and less than or equal to 0.01 wt % of S, remaining iron (Fe), and other unavoidable impurities. Alternatively, the base steel plate 100 may include one or more of an amount of 0.001 wt % to 0.005 wt % of B, an amount of 0.05 wt % to 0.5 wt % of Cr, an amount of 0.05 wt % to 0.3 wt % of molybdenum (Mo), and an amount of 0.05 wt % to 0.6 wt % of nickel (Ni). In addition, the base steel plate 100 may include one or more of titanium (Ti), niobium (Nb), and vanadium (V) in an amount of greater than 0 wt % and less than or equal to 0.1 wt %.

The plated layer 200 is formed to a thickness of 10 μm to 50 μm on at least one surface of the base steel plate 100, and includes Al. Herein, the thickness of the plated layer 200 may mean an average thickness of the plated layer 200 over an entire area of the plated layer 200. When the thickness of the plated layer 200 is less than 10 μm, the corrosion resistance of the base steel plate 100 (or the hot-stamping component 10) may be reduced, and when the thickness of the plated layer 200 exceeds 50 μm, the productivity of the hot-stamping component 10 may decrease, and the plated layer 200 may be attached to a roller or a mold during a hot stamping operation, and thus the plated layer 200 may be peeled off from the base steel plate 100.

The plated layer 200 may include a first layer 210 and a second layer 220 which are sequentially stacked on the base steel plate 100. In addition, the plated layer 200 may further include a surface layer 240 stacked on the second layer 220. The surface layer 240 is a layer including an amount greater than or equal to 80 wt % of Al, and the base steel plate 100 may be prevented from being oxidized by arranging the surface layer 240 on the base steel plate 100. For example, an average thickness of the surface layer 240 on the base steel plate 100 may be 100 nm to 500 nm.

The first layer 210 and the second layer 220 may be formed of polycrystalline. For example, the thickness of the second layer 220 may be formed greater than that of the first layer 210. For example, the thickness of the second layer 220 may be greater than the thickness of the first layer 210 by 1.6 times to 3.6 times. In a method of manufacturing a hot-stamping component to be described below, the plated layer 200 may be formed, by a thermal reaction in a blank heating operation of a hot stamping operation, as an Fe—Al-based plated layer in which Si is finally dissolved.

The plated layer 200 may include the first layer 210 on the base steel plate 100. The first layer 210 may include Fe, Al, and Si which are mixed with each other by heat diffusion during the hot stamping operation. For example, the first layer may have an α-Fe phase or an $Fe_3Al_2$ phase. Also, the first layer 210 may further include a void.

The plated layer 200 may include the second layer 220 on the first layer 210. In addition, the plated layer 200 may further include an intermetallic compound portion 230 in the second layer 220 in an island shape. The second layer may include at least one of an $FeAl_3$ phase and an $Fe_2Al_5$ phase, and an average grain size of the $FeAl_3$ phase and the $Fe_2Al_5$ phase may be 3 μm to 15 μm.

FIG. 2 is a diagram showing an evaluation result of peeling resistance of a second layer included in a hot-stamping component according to an embodiment. In detail, FIG. 2 is a diagram showing a result of measuring, through a dolly test, a strength at which the second layer 220 is peeled off from the base steel plate 100.

Referring to FIG. 2, when an average grain size of the second layer 220 is 3 μm (in case a), an adhesive strength thereof is 6.52 MPa, when the average grain size of the second layer 220 is 7 μm (in case b), the adhesive strength thereof is 6.09 MPa, when the average grain size of the second layer 220 is 10 μm (in case c), the adhesive strength thereof is 5.37 MPa, and when the average grain size of the second layer 220 is 15 μm (in case d), the adhesive strength thereof is 5.21 MPa. In addition, when the average grain size of the second layer 220 is 17 μm (in case e,) the adhesive strength thereof is 3.94 MPa, and when the average grain size of the second layer 220 is 20 μm (in case f,) the adhesive strength thereof is 3.85 MPa. Accordingly, it can be seen that when the average grain size of the second layer 220 exceeded 15 μm, the adhesive strength of the second layer 220 was lowered.

Therefore, when the average grain size of the second layer 220 exceeds 15 μm, the plated layer 200 may be easily peeled off from the base steel plate 100. In detail, as the adhesive strength of the second layer 220 is lowered when the average grain size of the second layer 220 exceeds 15 μm, the second layer 220 may be easily peeled off from the base steel plate 100 and/or the first layer 210.

Also, when using a method of manufacturing a hot-stamping component to be described below, it may be difficult to form an average grain size of less than 3 μm.

Accordingly, when the average grain size of the second layer 220 satisfies 3 μm to 15 μm, an adhesive strength of the plated layer 200 including the second layer 220 may be improved, and the peeling resistance of the plated layer 200 may be improved.

The intermetallic compound portion 230 may be in the second layer 220. The intermetallic compound portion 230 may be distributed in the second layer 220 in an island shape. The intermetallic compound portion 230 may be discontinuously arranged in the second layer 220. The weldability and the peeling resistance of a hot-stamping component may be improved by arranging the intermetallic compound portion 230 in the second layer 220 in an island shape.

Each intermetallic compound portion 230 discontinuously arranged in the second layer 220 may have a size of 1 μm to 5 μm. The intermetallic compound portion 230 may be distributed in a fraction of 20% to 60% with respect to a total cross-sectional area of the second layer 220. That is, an area fraction of the intermetallic compound portion 230 with respect to the second layer 220 may be 20% to 60%. When using the method of manufacturing a hot-stamping component to be described below, it is difficult to form the area fraction of the intermetallic compound portion 230 with respect to the second layer 220 to less than 20%. When the area fraction of the intermetallic compound portion 230 with respect to the second layer 220 exceeds 60%, the weldability of the hot-stamping component may decrease.

The intermetallic compound portion 230 may include an Fe—Al compound, and a content of Al included in the intermetallic compound portion 230 may be greater than a content of Al included in the second layer 220.

For example, the first layer 210 may include an amount of 82 wt % to 90 wt % of Fe, an amount greater than 0 wt % and less than or equal to 5 wt % of Si, and about 9 wt % to about 15 wt % of Al, the second layer 220 may include an amount of 39 wt % to 47 wt % of Fe, an amount greater than 0 wt % and less than or equal to 2 wt % of Si, and an amount of 53 wt % to 61 wt % of Al, and the intermetallic compound portion 230 may include an amount of 62 wt % to 67 wt %, an amount of 2 wt % to 6 wt % of Si, and an amount of 30 wt % to 34 wt % of Al.

Figure 3:
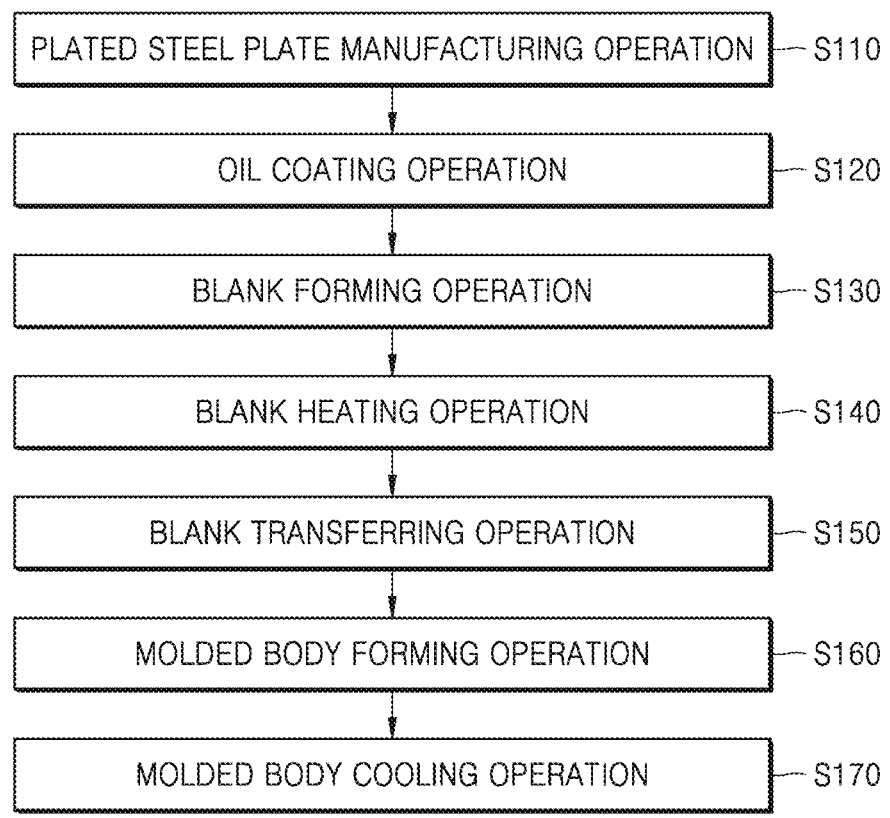
FIG. 3 is a schematic flowchart illustrating an operation of preparing a blank used in a method of manufacturing a hot-stamping component according to an exemplary embodiment.
Figure 4:
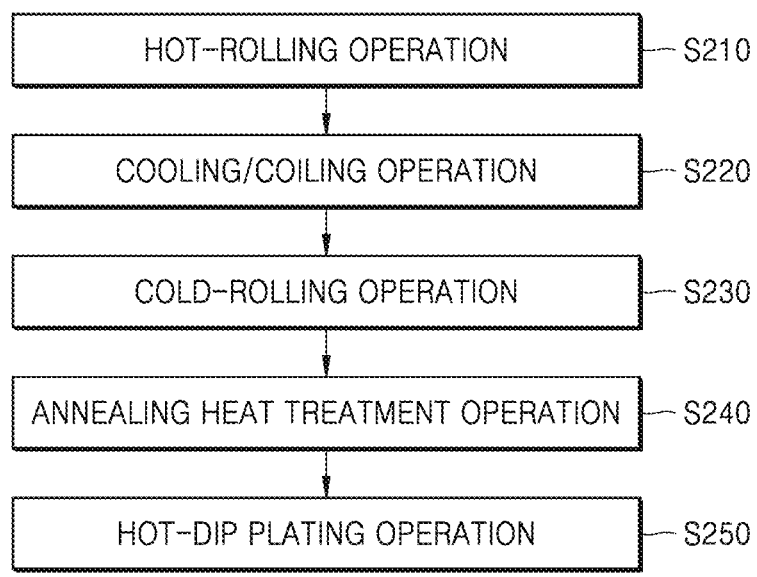
FIG. 4 is a schematic flowchart illustrating a method of manufacturing a hot-stamping component according to an exemplary embodiment.

FIG. 3 is a schematic flowchart illustrating a method of manufacturing a hot-stamping component according to an exemplary embodiment of the present disclosure, and FIG. 4 is a schematic flowchart illustrating an operation of manufacturing a plated steel plate of FIG. 3. Hereinafter, the method of manufacturing a hot-stamping component will be described with reference to FIGS. 3 and 4.

Referring to FIG. 3, the method of manufacturing a hot-stamping component according to an exemplary embodiment may include a plated steel plate manufacturing operation S110, an oil coating operation S120, a blank forming operation S130, a blank heating operation S140, a blank transferring operation S150, a molded body forming operation S160, and a molded body cooling operation S170.

For example, the method of manufacturing a hot-stamping component may include the oil coating operation S120, the blank forming operation S130, the blank heating operation S140, the blank transferring operation S150, the molded body forming operation S160, and the molded body cooling operation S170.

For example, in the method of manufacturing a hot-stamping component, the oil coating operation S120 may be performed after the blank forming operation S130 is performed. That is, the method of manufacturing a hot-stamping component may be performed in an order of the blank forming operation S130, the oil coating operation S120, the blank heating operation S140, the blank transferring operation S150, the molded body forming operation S160, and the molded body cooling operation S170.

As shown in FIG. 4, the plated steel plate manufacturing operation S110 may include a hot-rolling operation of a steel slab S210, a cooling/coiling operation S220, a cold-rolling operation S230, an annealing heat treatment operation S240, and a hot-dip plating operation S250.

First, a half finished steel slab, which is a target of an operation of forming a plated steel plate, is prepared. At this time, the steel slab may include an amount of 0.19 wt % to 0.38 wt % of C, an amount of 0.1 wt % to 1 wt % of Si, an amount of 1 wt % to 2 wt % of Mn, an amount of greater than 0 wt % and less than or equal to 0.03 wt % of P, an amount of greater than 0 wt % and less than or equal to 0.01 wt % of S, an amount of 0.1 wt % to 0.6 wt % of Cr, an amount of 0.01 wt % to 0.05 wt % of Ti, an amount of 0.001 wt % to 0.005 wt % of B, remaining Fe, and unavoidable impurities.

A reheating operation is performed on the steel slab for hot-rolling. In the operation of reheating the steel slab, segregated components, during casting, are re-used by reheating the steel slab secured through a continuous casting operation in a certain temperature. For example, a slab reheating temperature (SRT) may be 1200° C. to 1400° C. When the SRT is less than 1200° C., the segregated components may not be sufficiently re-used during casting, and thus, it may be difficult to observe a large homogenization effect of alloying elements. Also, a large solution effect of Ti may be difficult to be observed. Although a higher SRT is beneficial to homogenization, when the SRT exceeds 1400° C., it is difficult to secure the strength of a steel plate (or a hot-stamping component) due to an increase in austenite grain size, and the manufacturing cost of the steel plate may increase due to an excessive heating operation.

In the hot-rolling operation of a steel slab S210, the reheated steel slab is hot-rolled at a certain finishing delivery temperature (FDT). For example, the FDT may be 880° C. to 950° C. At this time, when the FDT is less than 880° C., it may be difficult to secure workability of a steel plate as a duplex grain structure occurs due to abnormal region rolling, and the workability of the steel plate is reduced due to uneven microstructures and as well as also mass flowing during hot-rolling may occur due to a rapid phase change. When the FDT exceeds 950° C., austenite grains may become coarse. In addition, TiC precipitates become coarse, and the performance of a hot-stamping component may decrease.

In the cooling/coiling operation S220, the hot-rolled steel plate is cooled to a certain coiling temperature (CT) to be coiled. For example, the CT is 550° C. to 800° C. The CT affects the redistribution of C, and when the CT is less than 550° C., the low-temperature phase fraction due to subcooling may increase, a rolling load may be deepened during cold-rolling, and the ductility of the steel plate (or the hot-stamping component) may rapidly decrease. On the other hand, when the CT exceeds 800° C., deterioration in the moldability and strength of the steel plate (or the hot-stamping component) may occur due to abnormal grain growth or excessive grain growth.

In the cold-rolling operation S230, the coiled steel plate is uncoiled to perform pickling, and then cold-rolled. At this time, pickling is performed to remove the scale of the coiled steel plate, that is, the scale of a hot-rolled coil manufactured through the hot-rolling operation described above.

The annealing heat treatment operation S240 is an operation of performing an annealing heat treatment on the cold-rolled steel plate at a temperature of 700° C. or higher. For example, the annealing heat treatment includes an operation of heating the cold-rolled steel plate and cooling the heated cold-rolled steel plate at a certain cooling rate.

The hot-dip plating operation S250 is an operation of forming a plated layer on the annealed heat-treated steel plate. For example, in the hot-dip plating operation S250, an Al—Si plated layer 200 may be formed on the annealed heat-treated steel plate, that is, the base steel plate 100.

In detail, in the hot-dip plating operation S250, the base steel plate 100 may be immersed in a hot-dip plating bath including an amount of 8 wt % to 12 wt % of Si and excess Al. At this time, the hot-dip plating bath may maintain a temperature of 400° C. to 700° C. The plated layer 200 may be formed by plating at 40 g/m² to 80 g/m² on both surfaces of the base steel plate 100.

The oil coating operation S120 is an operation of coating a plated steel plate manufactured by immersing the base steel plate 100 in a plating bath including Al and Si with an oil including an ester-based compound. The oil may include an amount of 10 wt % to 30 wt % of hydrotreated heavy paraffin refined oil, an amount of 30 wt % to 50 wt % of solvent-dewaxed heavy paraffin refined oil, an amount of 1 wt % to 5 wt % of solvent-refined heavy paraffin refined oil, and an amount of 10 wt % to 40 wt % of an ester-based compound. For example, the oil may include an amount of 10 wt % to 30 wt % of hydrotreated heavy paraffin refined oil, an amount of 30 wt % to 50 wt % of solvent-dewaxed heavy paraffin refined oil, an amount of 1 wt % to 5 wt % of solvent-refined heavy paraffin refined oil, and an amount of 3 wt % to 40 wt % of polyester. An ester component may be included in the solvent-dewaxed heavy paraffin refined oil and the polyester. In another exemplary embodiment, the oil may include an amount of 10 wt % to 30 wt % of hydrotreated heavy paraffin refined oil, an amount of 30 wt % to 50 wt % of solvent-dewaxed heavy paraffin refined oil, an amount of 1 wt % to 5 wt % of solvent-refined heavy paraffin refined oil, and an amount of 3 wt % to 40 wt % of metal ester. The ester component may be included in the solvent-dewaxed heavy paraffin refined oil and the metal ester. In an embodiment, "FERROCOTE® 6130", which is a commercial product of Quaker, may be used as the oil.

In the oil coating operation S120, the plated steel plate may be coated with the oil at 0.1 g/m² to 10 g/m² on. An oil film may be formed on a surface of the Al—Si plated layer by coating the plated steel plate with the oil at 0.1 g/m² to 10 g/m². The oil film formed on the surface of the Al—Si plated layer may not only affect a reaction between the base steel plate 100 and the Al—Si plated layer when heating a blank to be described below, but also reduce an amount of hydrogen flowing from the outside to the base steel plate 100 when the blank is heated. When the plated steel plate is coated with an amount of oil less than 0.1 g/m², a surface of a component manufactured by the method of manufacturing a hot-stamping component may be corroded. On the other hand, when the plated steel plate is coated with the amount of oil exceeding 10 g/m², a coil may be deformed (bucklied) in a radial direction.

For example, a method of manufacturing a plated steel plate for hot stamping may include the plated steel plate manufacturing operation S110 and the oil coating operation S120. A plated steel plate for hot stamping in which an oil is coated on the surface through the method of manufacturing a plated steel plate for hot stamping including the plated steel plate manufacturing operation S110 and the oil coating operation S120 may be manufactured.

The blank forming operation S130 is an operation of forming a blank by cutting the plated steel plated on which an oil is coated. In the blank forming operation S130, a blank may be formed by cutting the plated steel plated in which an oil is coated on the surface into a desired shape according to a purpose. A blank for hot stamping may be provided by cutting the plated steel plate in which an oil is coated on the surface.

For example, the oil coating operation S120 may be performed after the blank forming operation S130 is performed. In this case, in the blank forming operation S130, a blank may be formed by cutting the plated steel plate into a desired shape according to a purpose. In addition, in the oil coating operation S120, the blank formed through the blank forming operation S130 may be coated with an oil including an ester-based compound. In the oil coating operation S120, the oil may be coated at about 0.1 g/m² to about 10 g/m² on the blank.

The blank heating operation S140 may be an operation of heating the cut blank in a heating furnace. In detail, the blank heating operation S140 may be an operation of heating the cut blank in the heating furnace maintained at 800° C. to 1000° C.

For example, when the oil coating operation S120 is performed after the blank forming operation S130 is performed, the blank heating operation S140 may be an operation of heating a blank on which an oil is coated in a heating furnace. In detail, the blank heating operation S140 may be an operation of heating a blank, on which the blank forming operation S130 and the oil coating operation S120 are sequentially performed, in a heating furnace maintained at 800° C. to 1000° C.

For example, the blank heating operation S140 may include a step heating operation and a soaking operation. In the step heating operation, the blank may be heated in stages, and in the soaking operation, the blank may be soaked at a uniform temperature. In detail, in the step heating operation, as the blank passes through a plurality of sections provided in the heating furnace, the temperature of the blank may be raised in stages. There may be a plurality of sections in which the step heating operation is performed, among the plurality of sections provided in the heating furnace, and the temperature is set for each section so as to increase in a direction from an inlet of the heating furnace into which the blank is inserted to an outlet of the heating furnace from which the blank is discharged, and thus the temperature of the blank may be raised in stages. The soaking operation may be performed after the step heating operation. In the soaking operation, the stepwise heated blank may be heat-treated while passing through a section of the heating furnace set as a temperature of Ac3 to 1000° C. Preferably, in the soaking operation, the stepwise heated blank may be soaked at a temperature of 930° C. to 1000° C. More preferably, in the soaking operation, the stepwise heated blank may be soaked at a temperature of 950° C. to 1000° C. Also, among the plurality of sections provided in the heating furnace, there may be at least one section in which the soaking operation is performed.

Figure 5:
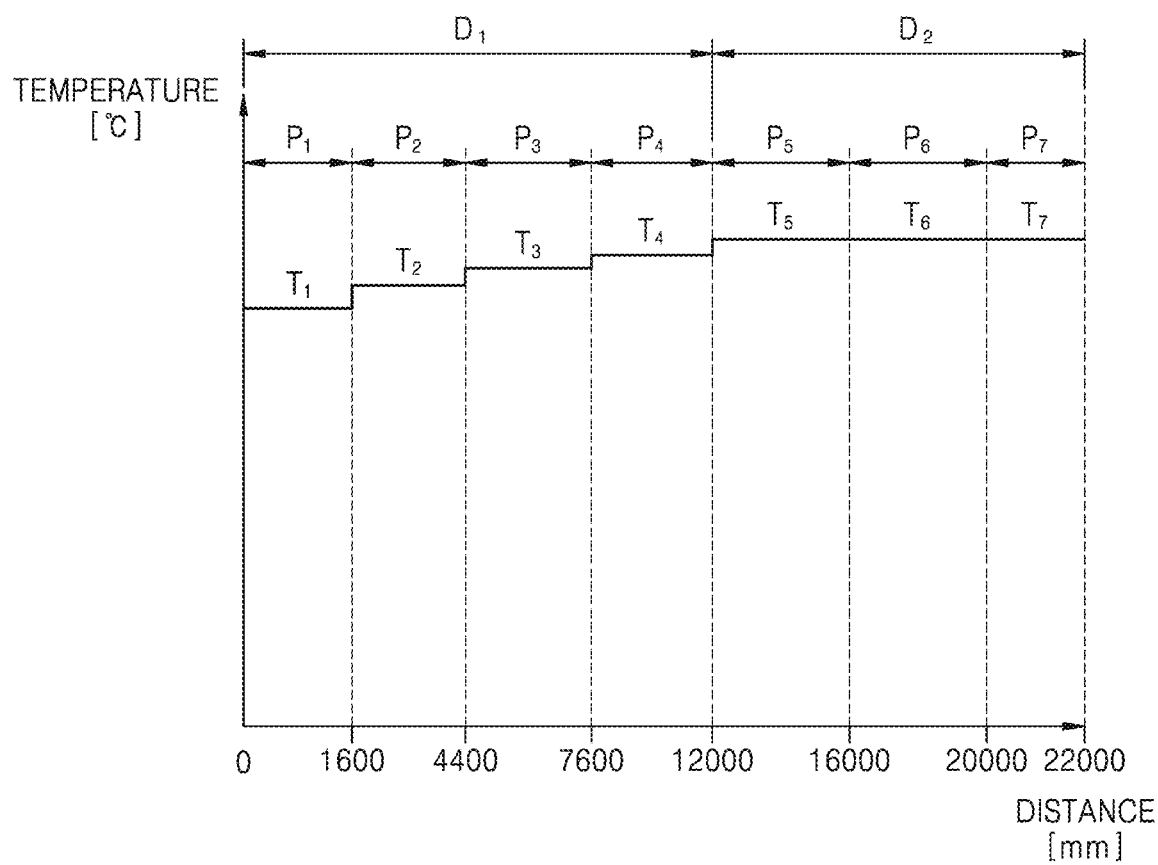
FIG. 5 is a diagram for explaining a blank heating operation of FIG. 3.

FIG. 5 is a diagram for explaining a heating furnace having a plurality of sections in the blank heating operation of the method of manufacturing a hot-stamping component according to an exemplary embodiment of the present disclosure.

Referring to FIG. 5, the heating furnace according to an exemplary embodiment may include a plurality of sections with different temperature ranges. In more detail, the heating furnace may include a first section $P_1$ having a first temperature range $T_1$, a second section $P_2$ having a second temperature range $T_2$, a third section $P_3$ having a third temperature range $T_3$, a fourth section $P_4$ having a fourth temperature range $T_4$, a fifth section $P_5$ having a fifth temperature range $T_5$, a sixth section $P_6$ having a sixth temperature range $T_6$, and a seventh section $P_7$ having a seventh temperature range $T_7$.

For example, in the step heating operation of the blank heating operation S140, a blank may be stepwise heated in stages while passing through a plurality of sections (for example, the first section $P_1$ to the fourth section $P_4$) defined in the heating furnace. In addition, in the soaking operation of the blank heating operation S140, the blank stepwise heated in the first section $P_1$ to the fourth section $P_4$ may be soaked in the fifth section $P_5$ to the seventh section $P_7$.

The first to seventh sections $P_1$ to $P_7$ may be sequentially arranged in the heating furnace. The first section $P_1$ having the first temperature range $T_1$ may be adjacent to an inlet of the heating furnace into which the blank is inserted, and the seventh section $P_7$ having the seventh temperature range $T_7$ may be adjacent to an outlet of the heating furnace from which the blank is discharged. Accordingly, the first section $P_1$ having the first temperature range $T_1$ may be a first section of the heating furnace, and the seventh section $P_7$ having the seventh temperature range $T_7$ may be a last section of the heating furnace. The fifth section $P_5$, the sixth section $P_6$, and the seventh section $P_7$ among the plurality of sections of the heating furnace, may not be sections in which step heating is performed, but rather be sections in which soaking is performed.

Temperatures of the plurality of sections provided in the heating furnace, for example, temperatures of the first to seventh sections $P_1$ to $P_7$, may increase in a direction from the inlet of the heating furnace into which the blank is inserted to the outlet of the heating furnace from which the blank is discharged. However, temperatures of the fifth section $P_5$, the sixth section $P_6$, and the seventh section $P_7$ may be the same. Also, a difference in temperature between two adjacent sections, among the plurality of sections provided in the heating furnace, may be greater than 0° C. and less than or equal to 100° C. For example, a difference in temperature between the first section $P_1$ and the second section $P_2$ may be greater than 0° C. and less than or equal to 100° C.

For example, the first temperature range $T_1$ of the first section $P_1$ may be 840° C. to 860° C., or 835° C. to 865° C. The second temperature range $T_2$ of the second section $P_2$ may be 870° C. to 890° C., or 865° C. to 895° C. The third temperature range $T_3$ of the third section $P_3$ may be 900° C. to 920° C., or 895° C. to 925° C. The fourth temperature range $T_4$ of the fourth section $P_4$ may be 920° C. to 940° C., or 915° C. to 945° C. The fifth temperature range $T_5$ of the fifth section $P_5$ may be Ac3 to 1000° C. Preferably, the fifth temperature range $T_5$ of the fifth section $P_5$ may be 930° C. or more and 1000° C. or less. More preferably, the fifth temperature range $T_5$ of the fifth section $P_5$ may be 950° C. or more to 1000° C. or less. The sixth temperature range $T_6$ of the sixth section $P_6$ and the seventh temperature range $T_7$ of the seventh section $P_7$ may be the same as the fifth temperature range $T_5$ of the fifth section $P_5$.

Although it is shown in FIG. 5 that the heating furnace according to an exemplary embodiment includes seven sections with different temperature ranges from each other, the present disclosure is not limited thereto. Five, six, or eight sections with different temperature ranges from each other may be provided in the heating furnace.

For example, the blank may be soaked after being stepwise heated. The soaking of the blank may be performed in the last portion among the plurality of sections provided in the heating furnace, and may be performed at a temperature of Ac3 to 1000° C.

The soaking operation may be performed in the last portion among the plurality of sections of the heating furnace. For example, the soaking operation may be performed in the fifth section $P_5$, the sixth section $P_6$, and the seventh section $P_7$ of the heating furnace. When a plurality of sections are provided in the heating furnace and a length of one section is long, there may be a problem such as a change in temperature within the section. Accordingly, the section in which the soaking operation is performed may be divided into the fifth section $P_5$, the sixth section $P_6$, and the seventh section $P_7$, and the fifth section $P_5$, the sixth section $P_6$, and the seventh section $P_7$ may have the same temperature range in the heating furnace.

In the soaking operation, the stepwise heated blank may be soaked at a temperature of Ac3 to 1000° C. Preferably, in the soaking operation, the stepwise heated blank may be soaked at a temperature of 930° C. to 1000° C. More preferably, in the soaking operation, the stepwise heated blank may be soaked at a temperature of 950° C. to 1000° C.

For example, a ratio of a length $D_1$ of a section for step heating the blank to a length $D_2$ of a section for soaking the blank may be 1:1 to 4:1. In more detail, a ratio of a sum of lengths of the first section $P_1$ to the fourth section $P_4$, which are sections for step heating the blank, to a sum of lengths of the fifth section $P_5$ to the seventh section $P_7$, which are sections for soaking the blank, may satisfy 1:1 to 4:1. When the length of the section for soaking the blank increases, so that the ratio of the length $D_1$ of the section for step heating the blank to the length $D_2$ of the section for soaking the blank is greater than 1:1, an austenite (FCC) structure is generated in the soaking section, which may increase an amount of hydrogen permeated into the blank, thereby increasing the risk of delayed fracture. Also, when the length of the section for soaking the blank decreases, so that the ratio of the length $D_1$ of the section for step heating the blank to the length $D_2$ of the section for soaking the blank is less than 4:1, sufficient sections (periods of time) for soaking are not secured, and thus the strength of a component manufactured by the method of manufacturing a hot-stamping component may be uneven.

For example, the soaking section among the plurality of sections provided in the heating furnace may have a length of 20% to 50% of the total length of the heating furnace.

In addition, in the blank heating operation S140, at least two blanks having different thicknesses from each other may be simultaneously transferred into the heating furnace.

For example, the blank may remain in the heating furnace for 180 seconds to 500 seconds. In more detail, a period of time for step heating the blank and soaking the blank in the heating furnace may be 180 seconds to 500 seconds. When the period of time for the blank to remain in the heating furnace is less than 180 seconds, it may be difficult for the blank to be sufficiently soaked at a desired temperature. Also, when the period of time for the blank to remain in the heating furnace is more than 500 seconds, an amount of hydrogen permeated into the blank increases, thereby leading to an increased risk of delayed fracture and deterioration in corrosion resistance after a hot stamping operation.

Figure 6:
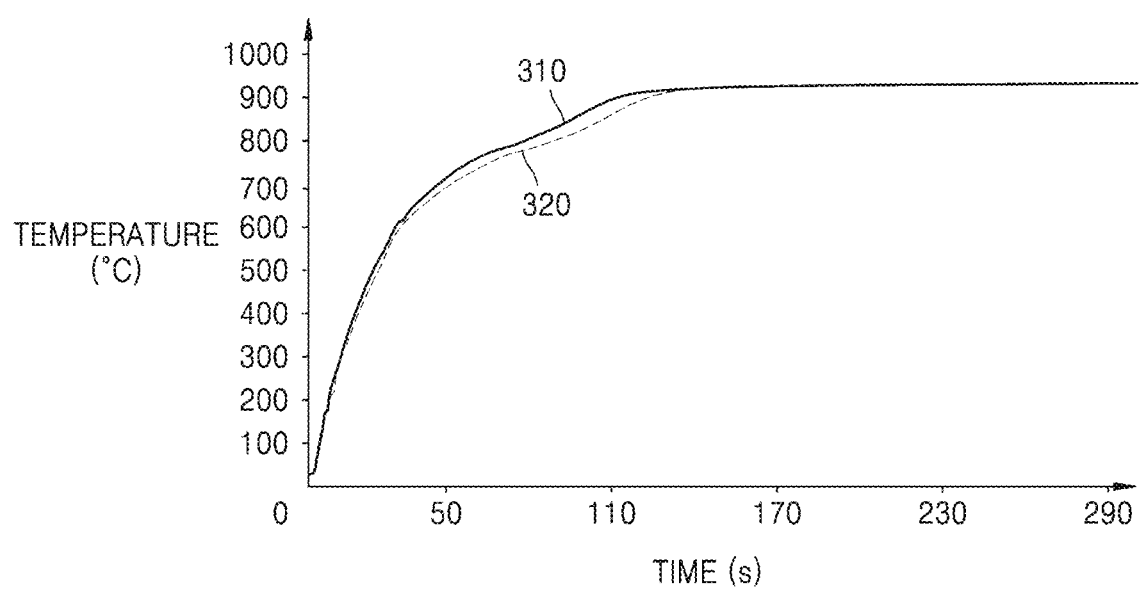
FIG. 6 is a graph showing a change in temperature over time of a blank coated with an oil including an ester-based compound and a blank coated with a general oil.

FIG. 6 is a graph showing a change in temperature over time of a blank coated with an oil including an ester-based compound and a blank coated with a general oil.

Referring to FIG. 6, although a substantially the same heating rate from room temperature to 600° C. is shown in cases of a blank 310 coated with an oil including an ester-based compound and a blank 320 coated with a general oil, it can be seen that the heating rate of the blank 310 coated with the oil including the ester-based compound was faster than the heating rate of the blank 320 coated with the general oil at a temperature of 600° C. to 900° C. That is, it can be seen that the heating rate of the blank 310 coated with the oil including an amount of 10 wt % to 40 wt % of the ester-based compound was faster than the heating rate of the blank 320 coated with the general oil.

A hydrolysis reaction of the ester-based compound occurs in a section of which the temperature of the blank is 600° C. to 900° C. The hydrolysis reaction of the ester-based compound is an endothermic reaction, and the temperature of the heating furnace in the corresponding section is increased to promote the hydrolysis reaction, so that the inflow of hydrogen into the blank may be blocked, and the plated layer 200 including the first layer 210, the second layer 220, and the island-shaped intermetallic compound portion 230 in the second layer 220 may be formed on the base steel plate 100, as described in FIG. 1. At this time, an average heating rate of a blank in a section at a temperature of 600° C. to 900° C. of the blank 310 coated with an oil including 10 wt % to 40 wt % of the ester-based compound may be about 4.5° C./s to about 10° C./s.

For example, the oil may include an amount of 10 wt % to 40 wt % of the ester-based compound. As an amount of 10 wt % to 40 wt % of the ester-based compound is included in the oil, an amount of diffusible hydrogen may be decreased to improve the hydrogen delayed fracture performance, and a dense oxide film may be formed by the hydrolysis reaction of the ester-based compound. When the oil includes less than 10 wt % of the ester-based compound, the amount of diffusible hydrogen may increase, and hydrogen delayed fracture may occur. On the other hand, when the oil includes greater than 40 wt % of the ester-based compound, stains may exist on a surface of a component manufactured by the method of manufacturing the hot-stamping component.

The blank transferring operation S150 is an operation of transferring the heated blank from the heating furnace to a press mold. In the blank transferring operation S150, the heated blank may be air-cooled for 10 seconds to 15 seconds.

The molded body forming operation S160 is an operation of forming a molded body by hot-stamping the transferred blank. The molded body cooling operation S170 is an operation of cooling the formed molded body.

A final product may be formed by cooling the molded body at the same time as molding the molded body into a final component shape. A cooling channel through which a refrigerant circulates may be provided in the press mold. The heated blank may be rapidly cooled by circulation of the refrigerant supplied through the cooling channel provided in the press mold. In this regard, in order to prevent a spring back phenomenon and maintain a desired shape of a plate material, the blank may be pressed and rapidly cooled while the press mold is closed. When molding and cooling the heated blank, the blank may be cooled with an average cooling rate of at least 10° C./s to a martensite end temperature. The blank may be held in the press mold for about 3 seconds to about 20 seconds. When a period of time for the blank being held in the press mold is less than 3 seconds, cooling of a material is not sufficiently performed, and thus temperature variation of each portion due to residual heat may affect embrittlement quality. In addition, because a sufficient amount of martensite is not generated, mechanical properties may not be secured. On the other hand, when the period of time for the blank being held in the press mold is more than 20 seconds, the time being held in the press mold may be increased, thereby causing lower productivity.

A hot-stamping component (member) having delayed fracture performance may be formed by applying the above-stated composition and operation conditions. The microstructure of a base layer of the hot-stamping component may have a full-martensite structure, and may satisfy a yield strength of 900 MPa or more, a tensile strength of 1350 MPa or more, an elongation rate of 5% or more.

Hereinafter, the present disclosure will be described in more detail through embodiments. However, the following embodiments are for explaining the present disclosure in more detail, and the scope of the present disclosure is not limited to the following embodiments. Numerous modifications and adaptations will be readily apparent to one of ordinary skill in the art without departing from the spirit and scope.

TABLE 1

| | Component (wt %) | | | | | | | |
|---|---|---|---|---|---|---|---|---|
| | C | Si | Mn | P | S | Cr | Ti | B |
| Composition 1 | 0.23 | 0.24 | 1.17 | 0.014 | 0.002 | 0.17 | 0.03 | 0.002 |
| Composition 2 | 0.29 | 0.21 | 1.39 | 0.01 | 0.001 | 0.19 | 0.031 | 0.002 |

TABLE 2

| | Composition | Oil | Whether Step Heating has Performed | Soaking Temperature (° C.) | Retention in Heating Furnace Time (s) |
|---|---|---|---|---|---|
| Embodiment 1 | Composition 1 | Oil 1 | ○ | 950 | 300 |
| Embodiment 2 | Composition 1 | Oil 1 | ○ | 950 | 420 |
| Embodiment 3 | Composition 2 | Oil 1 | ○ | 900 | 300 |
| Comparative Example 1 | Composition 1 | Oil 2 | ○ | 950 | 300 |
| Comparative Example 2 | Composition 1 | Oil 2 | ○ | 950 | 420 |
| Comparative Example 3 | Composition 2 | Oil 2 | ○ | 900 | 300 |
| Comparative Example 4 | Composition 1 | Oil 1 | X | 950 | 300 |
| Comparative Example 5 | Composition 2 | Oil 1 | X | 900 | 420 |

Table 1 is a table showing a composition of a base steel plate according to an exemplary experimental embodiment of the present disclosure, and Table 2 is a table showing steel plate compositions, oil conditions, cases whether step heating has performed, soaking temperatures, and retention time in a heating furnace for manufacturing a hot-stamping component according to an exemplary experimental embodiment of the present disclosure.

The composition 1 of Table 1 was set for a tensile strength of 1350 MPa or more as a target, and the composition 2 was set for a tensile strength of 1680 MPa or more as a target.

Referring to Tables 1 and 2, steel materials of Embodiments 1 and 2, and Comparative Examples 1, 2, and 4 may include a composition of composition 1 in Table 1 and excess Fe, and steel materials of Embodiment 3, and Comparative Examples 3 and 5 may have a composition of composition 2 and excess Fe. Hot-rolling, cooling/coiling, cold-rolling, an annealing heat treatment, and a hot-dip plating treatment were performed on the steel materials having compositions of Embodiments 1 to 3, and Comparative Examples 1 to 5.

In the cases of Embodiments 1 to 3, and Comparative Examples 4 and 5, an oil film was formed by coating a surface of an Al—Si plated layer with 0.1 g/m² of oil 1. In the cases of Comparative Examples 1 to 3, an oil film was formed by coating the surface of the Al—Si plated layer with 0.1 g/m² of oil 2. At this time, a "Ferrocote 6130" product of Quaker was used as the oil 1, and "BW-80HG", which is a commercial product of Buhmwoo, was used as the oil 2. The oil 1 includes 10 wt % to 40 wt % of polyester, but the oil 2 includes less than 10 wt % of ester-based compounds.

Subsequently, blanks of Embodiments 1 to 3, in which the oil 1 was coated on surfaces, and blanks of Comparative Examples 1 to 3, in which the oil 2 was coated on surfaces, were heated according to the conditions in Table 2, and the heated blanks were transferred to a molding mold to perform press molding and cooled at a cooling rate of 10° C./s or greater, thereby manufacturing hot-stamping components. In addition, blanks of Comparative Examples 4 and 5, in which the oil 1 was coated on surfaces, were heated (single-heated) at a uniform temperature according to the conditions in Table 2, and the heated blanks were transferred to the molding mold to perform press molding and cooled at a cooling rate of 10° C./s or greater, thereby manufacturing hot-stamping components. Single-heated means heating the blank at a constant temperature.

<Tensile Strength Test>

After manufacturing the hot-stamping components of Embodiments 1 to 3, and Comparative Examples 1 to 5 of Table 3, a yield strength, a tensile strength, and an elongation rate at room temperature were measured.

TABLE 3

| | Material Characteristics | | |
|---|---|---|---|
| | Yield Strength (MPa) | Tensile Strength (MPa) | Elongation Rate (%) |
| Embodiment 1 | 908 | 1413 | 8.3 |
| Embodiment 2 | 912 | 1432 | 8.1 |
| Embodiment 3 | 1058 | 1713 | 7.3 |
| Comparative Example 1 | 905 | 1409 | 8.1 |
| Comparative Example 2 | 910 | 1428 | 8.0 |
| Comparative Example 3 | 1031 | 1704 | 7.1 |
| Comparative Example 4 | 901 | 1356 | 8.2 |
| Comparative Example 5 | 1027 | 1684 | 7.2 |

Table 3 is a table showing the yield strength, tensile strength, and elongation rate at room temperature of Embodiments 1 to 3, and Comparative Examples 1 to 5. Referring to Table 4, it can be seen that in the cases of Embodiments 1 and 2, the yield strength was 900 MPa or more, the tensile strength was 1350 MPa or more, and the elongation rate was 5% or more. In addition, it can be seen that in the case of Embodiment 3, the tensile strength was 1680 MPa or more and the yield strength was 1000 MPa or more.

Accordingly, even when a hot-stamping component is manufactured by a blank in which an oil (oil 1) including about 10 wt % to about 40 wt % of ester-based compounds is coated on a plated layer, the hot-stamping component may have a tensile strength greater than or equal to a preset target (for example, 1350 MPa or 1680 MPa).

<Evaluation of an Amount of Diffusible Hydrogen and Hydrogen Delayed Fracture Characteristic>

Thermal desorption spectroscopy was performed on Embodiments 1 to 3, and Comparative Examples 1 to 5. In detail, an amount of diffusible hydrogen emitted from the hot-stamping component was measured under 350° C. or less, while raising the temperature form room temperature to 500° C. at a heating rate of 20° C./min. In addition, evaluation of hydrogen delayed fracture was conducted on Embodiments 1 to 3, and Comparative Examples of 1 to 5. The evaluation of the hydrogen delayed fracture was performed by a four-point bending test. The four-point bending test is a test method for checking whether stress corrosion cracking occurs by applying a stress having a level below an elastic limit at a particular point of a specimen manufactured by reproducing a state exposed to a corrosive environment. At this time, stress corrosion cracking refers to a crack that occurs when corrosion and continuous tensile stress act simultaneously.

In detail, a stress of 1000 MPa in air was applied on each sample in Embodiments 1 and 2, and Comparative Examples 1 and 2, which had a tensile strength of 1350 MPa or more, for 100 hours to check whether a fracture occurs. In addition, a stress of 1200 MPa in air was applied to each sample in Embodiment 3, and Comparative Examples 3 and 4, which had a tensile strength of 1680 MPa, for 100 hours to check whether a fracture occurs.

TABLE 4

| | Amount of Diffusible Hydrogen (wppm) | Hydrgen Delayed Fracture |
|---|---|---|
| Embodiment 1 | 0.41 | Non-fractured |
| Embodiment 2 | 0.46 | Non-fractured |
| Embodiment 3 | 0.346 | Non-fractured |
| Comparative Example 1 | 0.66 | Fractured |
| Comparative Example 2 | 0.92 | Fractured |
| Comparative Example 3 | 0.528 | Fractured |
| Comparative Example 4 | 0.79 | Fractured |
| Comparative Example 5 | 0.61 | Fractured |

Figure 7A:
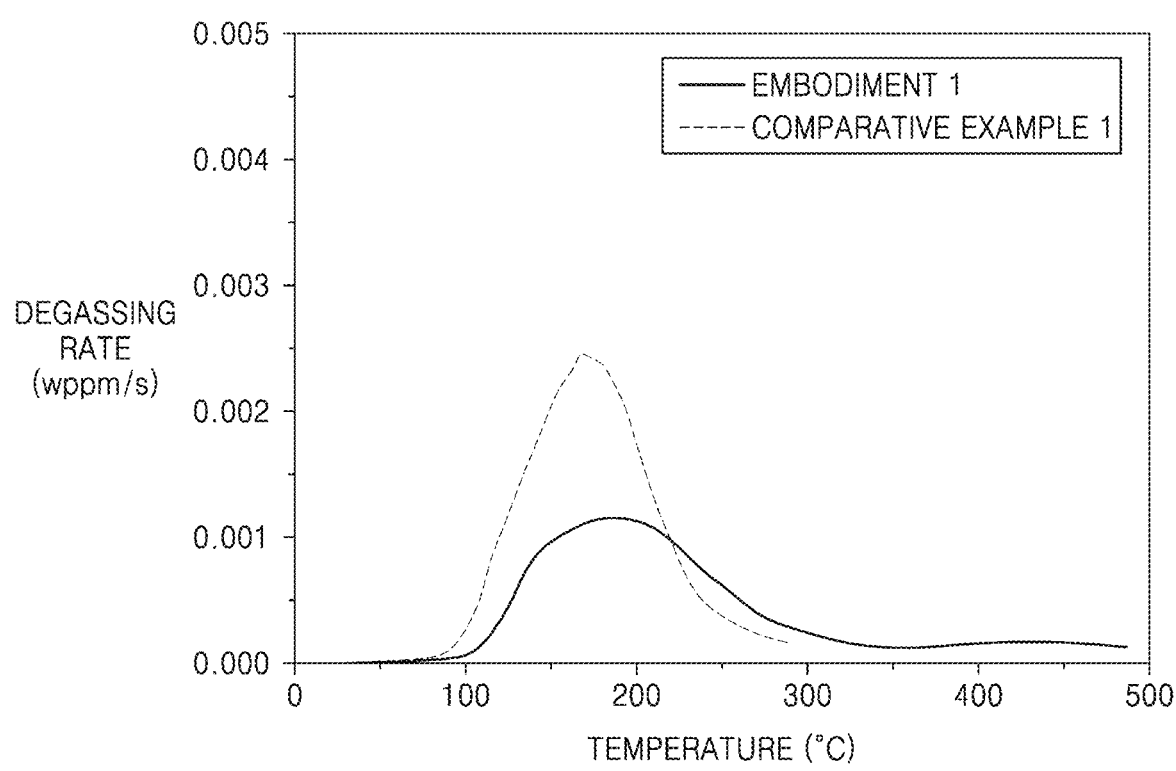
FIGS. 7A to 7C are graphs respectively showing heating degassing analysis results of Embodiment 1 and Comparative Example 1, Embodiment 2 and Comparative Example 2, and Embodiment 3 and Comparative Example 3.
Figure 7B:
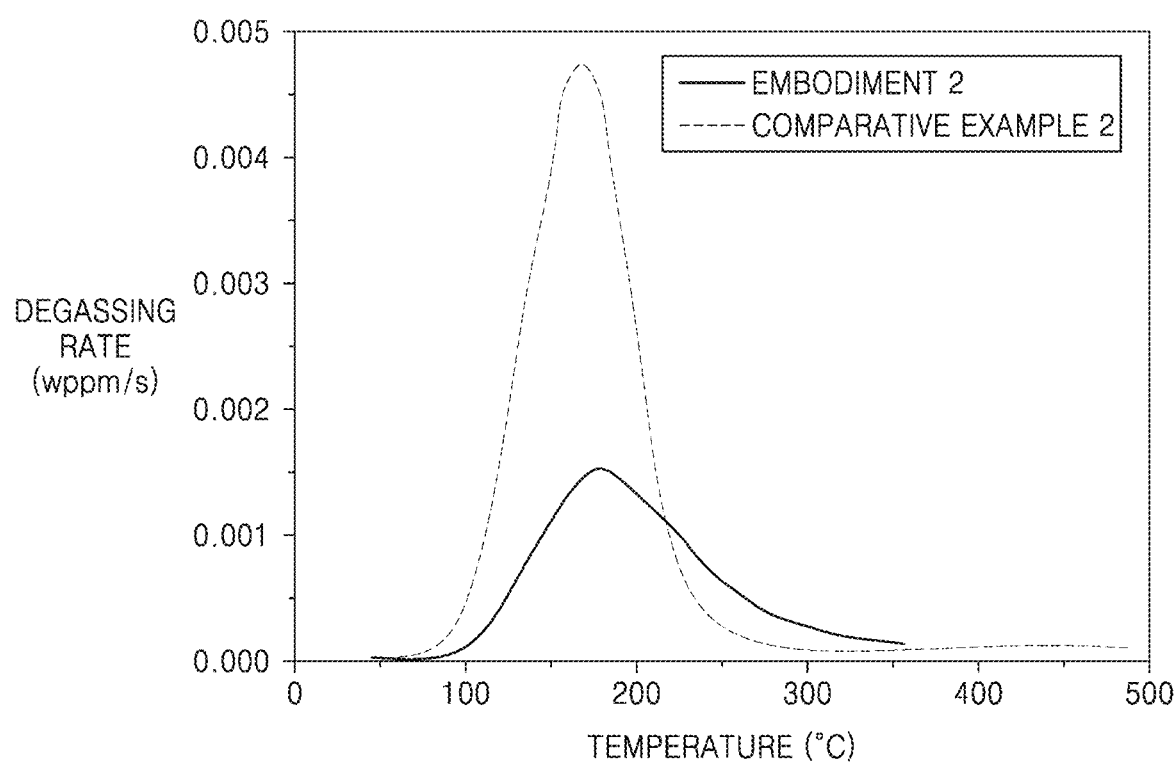
Figure 7C:
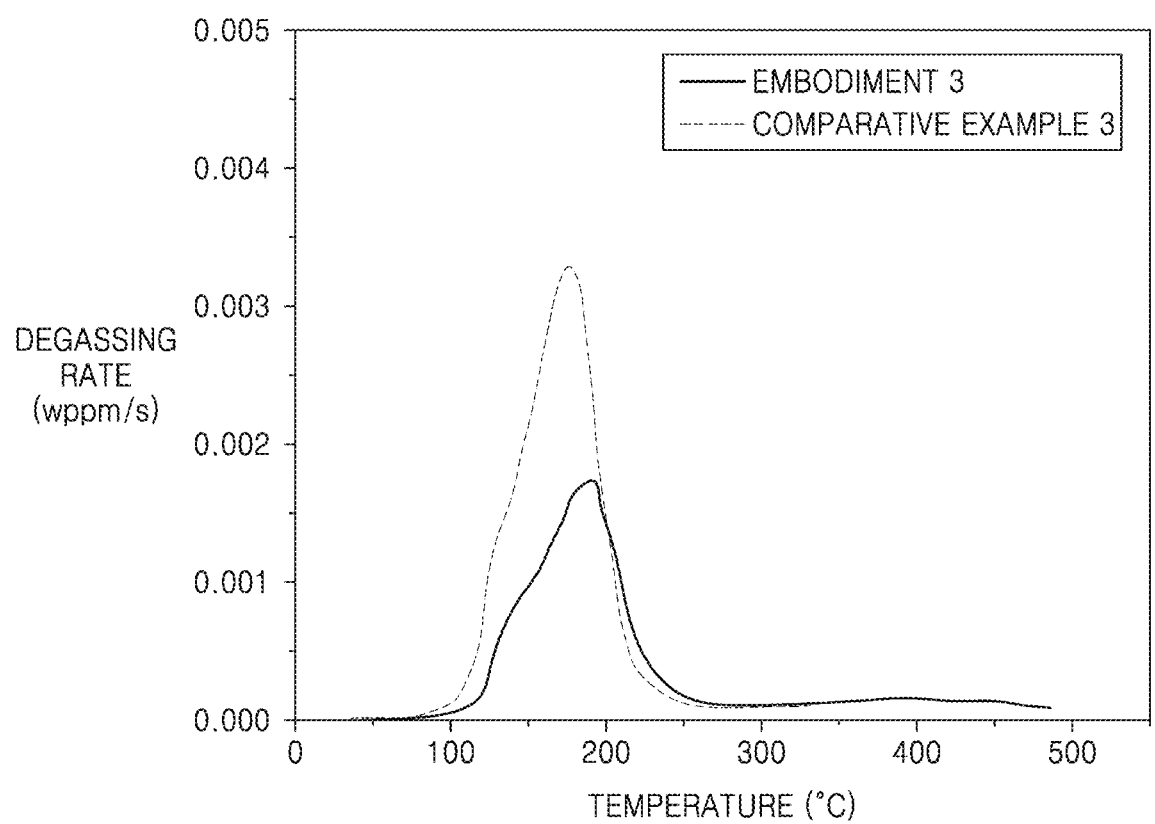

FIGS. 7A to 7C are graphs respectively showing heating degassing analysis results of Embodiment 1 and Comparative Example 1, Embodiment 2 and Comparative Example 2, and Embodiment 3 and Comparative Example 3, and Table 4 is a table showing an amount of diffusible hydrogen emitted from Embodiments 1 to 3, and Comparative Examples 1 to 5, and an evaluation result of hydrogen delayed fracture.

Referring to FIG. 7A and Table 4, it can be seen that at a temperature of 300° C. or less, an amount of diffusible hydrogen emitted from Embodiment 1 was less than an amount of diffusible hydrogen emitted from Comparative Example 1. Also, according to an evaluation result of hydrogen delayed fracture, fracture did not occur in Embodiment 1, but fracture occurred in Comparative Example 1.

Referring to FIG. 7B and Table 4, it can be seen that at a temperature of 300° C. or less, an amount of diffusible hydrogen emitted from Embodiment 2 was less than an amount of diffusible hydrogen emitted from Comparative Example 2. Also, according to an evaluation result of hydrogen delayed fracture, fracture did not occur in Embodiment 2, but fracture occurred in Comparative Example 2.

Referring to FIG. 7C and Table 4, it can be seen that at a temperature of 300° C. or less, an amount of diffusible hydrogen emitted from Embodiment 3 was less than an amount of diffusible hydrogen emitted from Comparative Example 3. Also, according to an evaluation result of hydrogen delayed fracture, fracture did not occur in Embodiment 3, but fracture occurred in Comparative Example 3.

Accordingly, when a surface of a plated layer is coated with an oil (oil 1) including an ester-based compound, an amount of hydrogen inflow from the outside may decrease, and thus, the resistance against delayed hydrogen fracture was excellent.

In addition, an amount of diffusible hydrogen emitted from each of Embodiments 1 and 3, on which stepwise heating was performed, was less than an amount of diffusible hydrogen emitted from each of Comparative Examples 4 and 5, on which single-heating was performed, and according to the evaluation result of hydrogen delayed fracture, fracture did not occur in Embodiments 1 and 3, but fracture occurred in Comparative Examples 4 and 5.

Accordingly, as compared with a case of performing single-heating, in the case of performing step heating, the amount of hydrogen inflow was reduced, and thus, the resistance against hydrogen delayed fracture was excellent.

<Observation of Thickness of Surface Layer>

Figure 8A:
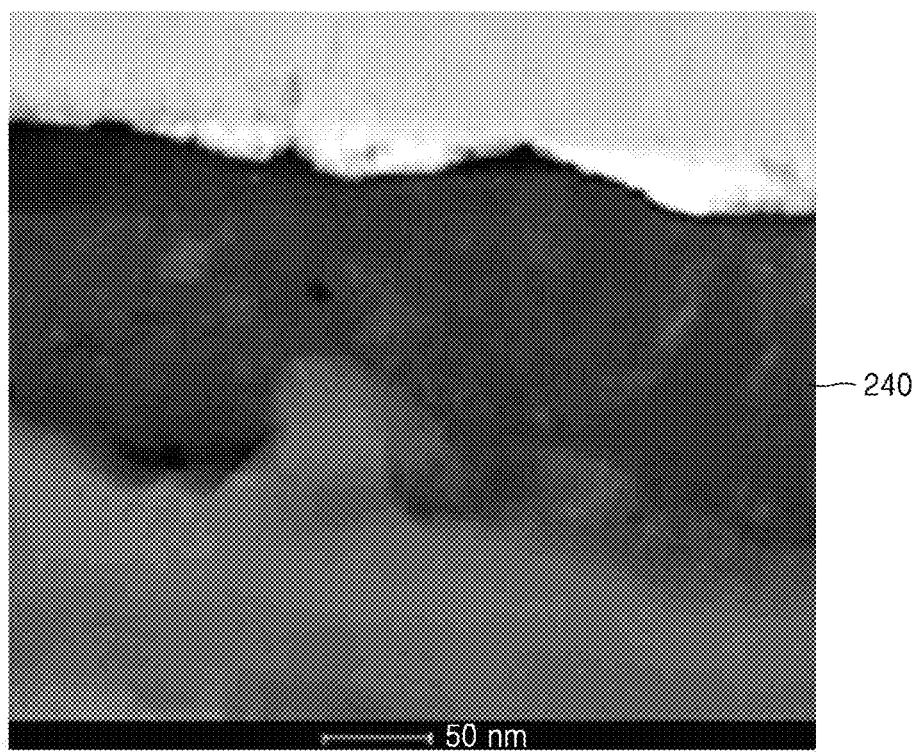
FIGS. 8A and 8B are photographs respectively showing a surface layer of Embodiment 1 and Comparative Example 1.
Figure 8B:
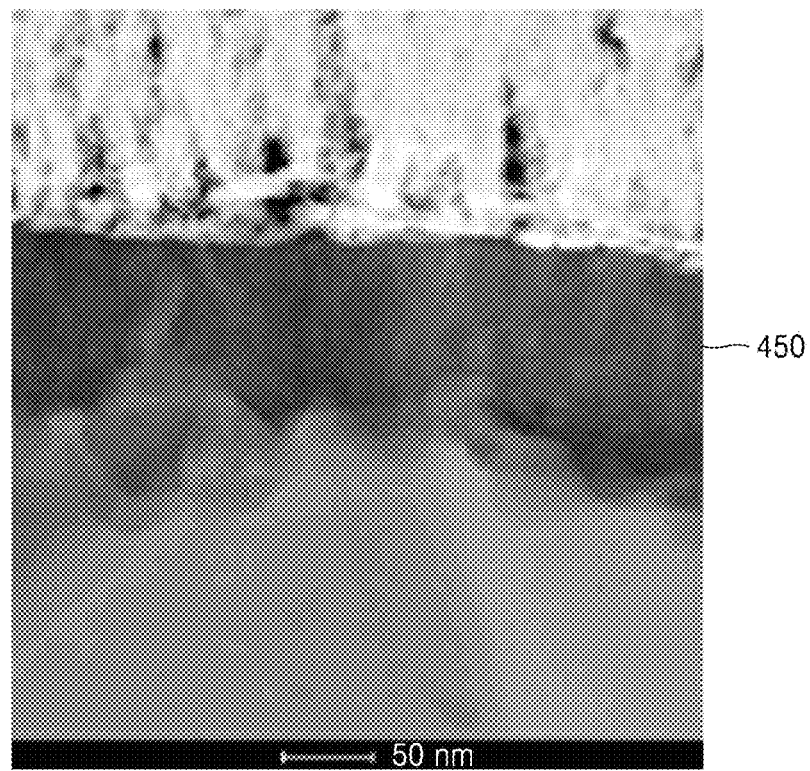

FIGS. 8A and 8B are photographs respectively showing a surface layer of Embodiment 1 and Comparative Example 1. FIGS. 8A and 8B are diagrams showing results of measuring cross sections of Embodiment 1 and Comparative Example 1 by a transmission electron microscope (TEM).

Referring to FIGS. 8A and 8B, a thickness of the surface layer 240 of Embodiment 1 was about 165 nm, and a thickness of a first surface area 450 of Comparative Example 1 was about 92 nm. Accordingly, Embodiment 1 had a surface layer having a thickness greater than that of Comparative Example 1, and it is determined that the difference in thickness was caused by a difference in heating rates of the blank in Embodiment 1 and the blank of Comparative Example 1, as shown in FIG. 6. Because the surface layer 240 of Embodiment was formed thicker than the surface layer 450 of Comparative Example 1, the base steel plate 100 may be more effectively prevented from being oxidized when a plated layer is coated with an oil (oil 1) including an ester-based compound.

<Weldability Evaluation>

Weldability evaluation was conducted on Embodiment 1 and Comparative Example 1. In the weldability evaluation, a 6 mm welding tip was applied to a welding portion with a pressing force of 350 kgf for 4 minutes at 930° C., and contact resistance was measured in a state of applying a current.

Figure 9:
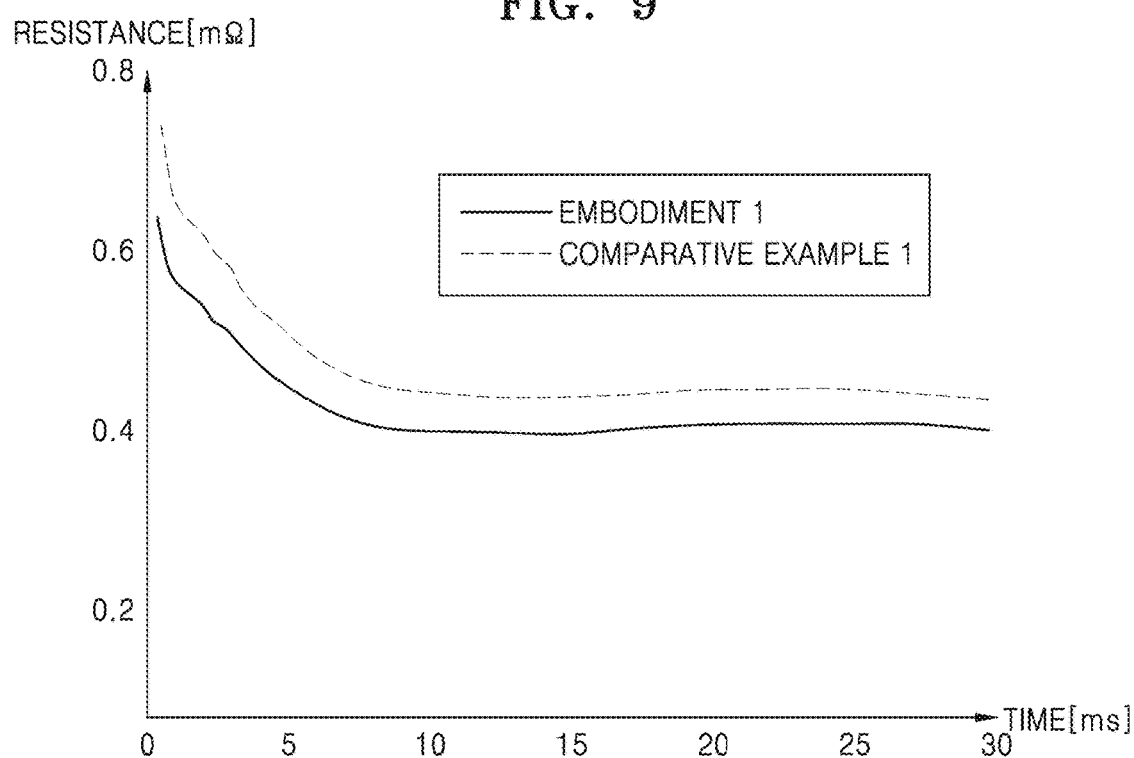
FIG. 9 is a graph showing resistance measurement results of hot-stamping components according to Embodiment 1 and Comparative Example 1 during spot welding.

FIG. 9 is a graph showing resistance measurement results during spot welding of Embodiment 1 and Comparative Example 1.

Referring to FIG. 9, it can be seen that a contact resistance of Embodiment 1 was less than a contact resistance of Comparative Example 1. In particular, it can be seen that the contact resistance of Embodiment 1 in about 5 ms during an initial welding period was less than the contact resistance of Comparative Example 1. Accordingly, because the contact resistance of Embodiment 1 was less than the contact resistance of Comparative Example 1, it can be confirmed that a hot-stamping component of Embodiment 1 had excellent weldability compared to a hot-stamping component of Comparative Example 1.

<Corrosion Resistance Evaluation>

Corrosion Evaluation was conducted on the hot-stamping components of Embodiment 1 and Comparative Example 1. In the corrosion evaluation, a three-electrode electrochemical cell was constructed by using a working electrode as a specimen, a high-purity carbon rod as a counter electrode, a saturated calomel electrode as a reference electrode, to carry out a copper potential polarization test. The copper potential polarization test was carried out after verifying electrochemical stabilization by measuring an open-circuit potential (OCP) in a 3.5% sodium chloride (NaCl) solution for 10 hours, and a potential from about −250 mVSCE to about 0 mVSCE based on a corrosion potential (Ecorr) was applied at a scanning rate of 0.166 mV/s.

Figure 10:
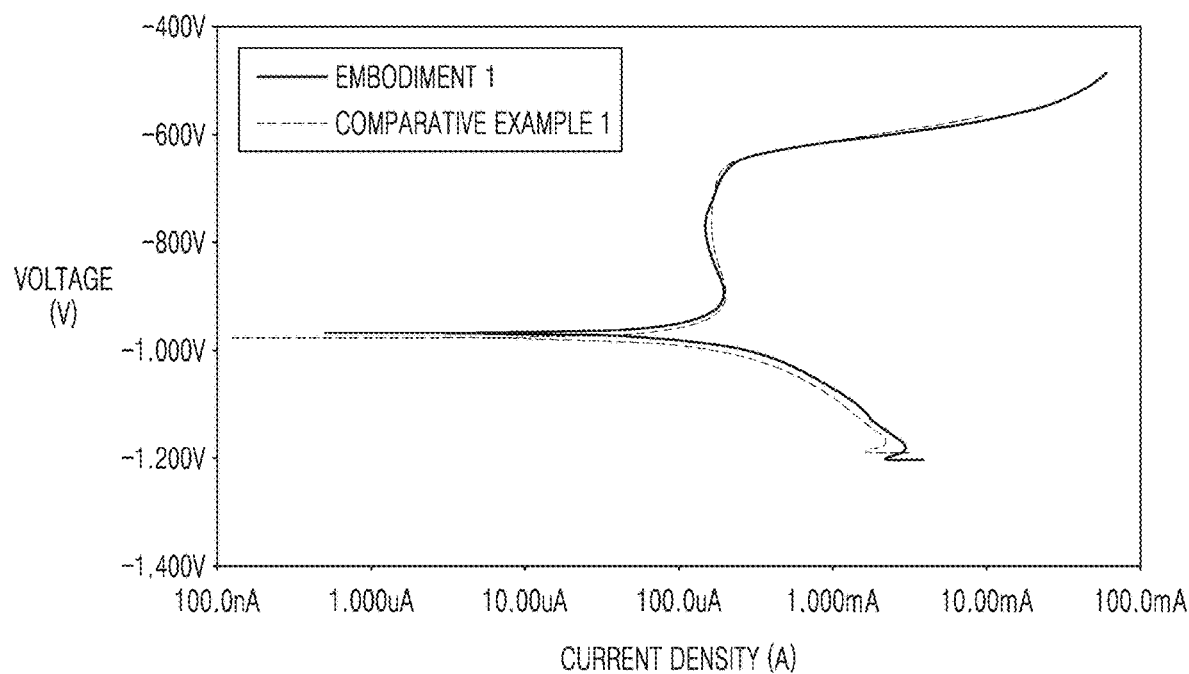
FIG. 10 is a graph showing corrosion evaluation experiment results of Embodiment 1 and Comparative Example 1.

FIG. 10 is a graph showing corrosion evaluation experiment results of Embodiment 1 and Comparative Example 1. The graph of FIG. 10 is corrosion current measurement results of Embodiment 1 and Comparative Example 1, and a corrosion current is a value corresponding to a current density at a time when a branch of a stably maintained potential occurs.

Referring to FIG. 10, a corrosion current of Embodiment 1 was measured as $5 \times 10^{-4}$ A, and a corrosion current of Comparative Example 1 was measured as $5 \times 10^{-4}$ A. Accordingly, it can be seen that a current density related to corrosion of Embodiment 1 was less than a current density related to corrosion of Comparative Example 1. Therefore, it can be confirmed that the corrosion resistance of Example 1 was superior to that of Comparative Example 1.

According to exemplary embodiments of the present disclosure, a blank coated with an oil including an ester-based compound may be hot-stamped to improve the hydrogen embrittlement, corrosion resistance, and weldability of a component manufactured by hot stamping.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of manufacturing a hot-stamping component, the method comprising:
    manufacturing a plated steel plate by immersing a base steel plate in a plating bath comprising aluminum and silicon;
    coating the plated steel plate with an oil comprising an ester-based compound;
    forming a blank by cutting the plated steel plate coated with the oil; and
    heating the blank in a heating furnace,
    wherein the oil comprises an amount of 10 wt % to 30 wt % of hydrotreated heavy paraffin refined oil, an amount of 30 wt % to 50 wt % of solvent-dewaxed heavy paraffin refined oil, an amount of 1 wt % to 5 wt % of solvent-refined heavy paraffin refined oil, and an amount of 10 wt % to 40 wt % of an ester-based compound.

2. The method of claim 1, wherein the oil is coated at 0.1 g/m² to 10 g/m² on the plated steel plate.

3. The method of claim 1, wherein in the heating of the blank in the heating furnace, the heating furnace has a plurality of sections having different temperature ranges from each other, and the blank is heated in stages in the heating furnace.

4. The method of claim 3, wherein in the heating of the blank in the heating furnace, at least two blanks having different thicknesses from each other are simultaneously transferred into the heating furnace.

5. The method of claim 1, further comprising, after the heating of the blank, transferring the heated blank from the heating furnace to a press mold;

forming a molded body by hot-stamping the transferred blank; and cooling the formed molded body.

* * * * *